Oct. 25, 1932.   J. E. WHITFIELD   1,884,448
HAND WHEEL
Filed Jan. 24, 1931
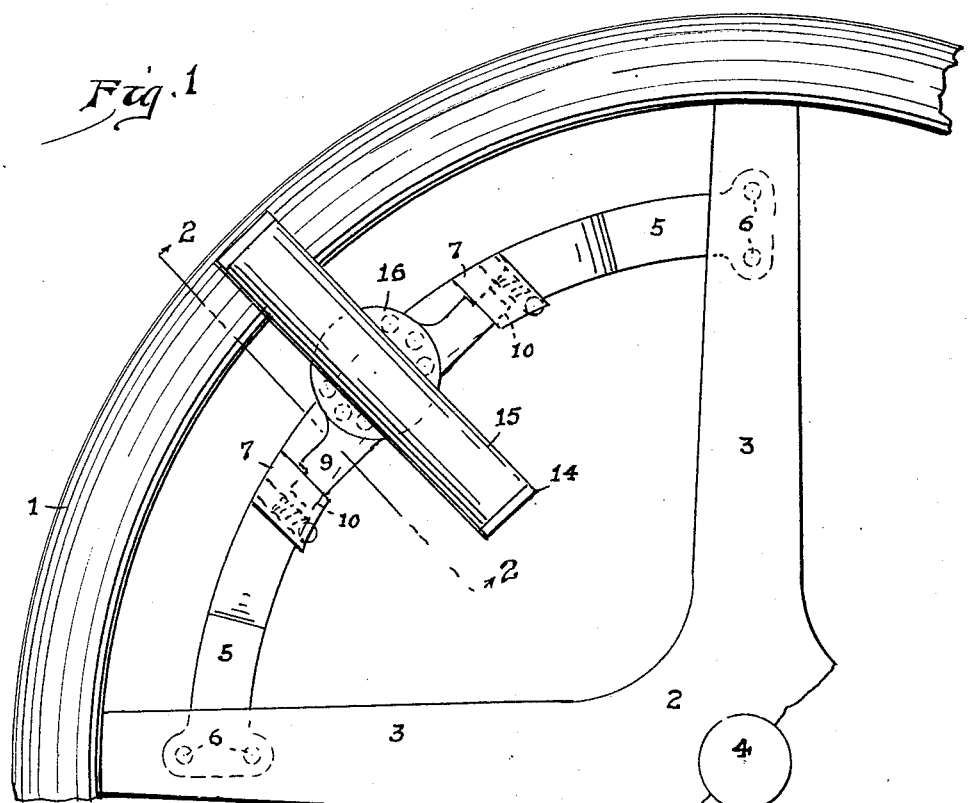
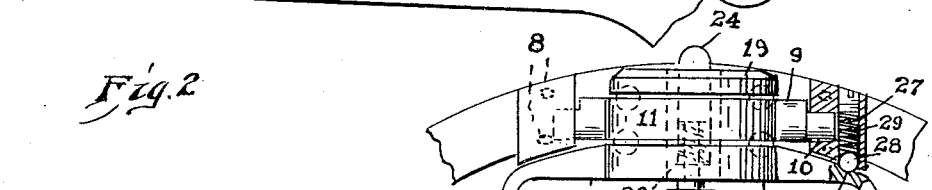
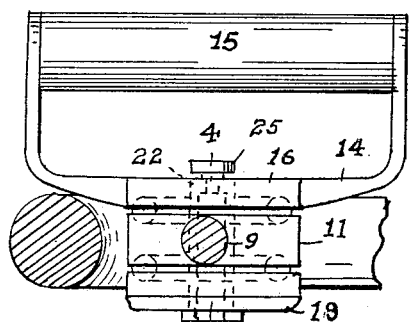
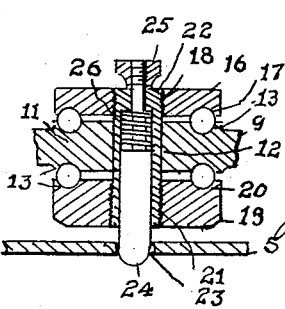
INVENTOR
Joseph E. Whitfield
by Edward A. Lawrence
his attorney Patented Oct. 25, 1932

1,884,448

UNITED STATES PATENT OFFICE

JOSEPH E. WHITFIELD, OF PITTSBURGH, PENNSYLVANIA, ASSIGNOR OF ONE-HALF TO HENNING A. JOHNSON, OF PITTSBURGH, PENNSYLVANIA

HAND WHEEL

Application filed January 24, 1931. Serial No. 511,021.

Although highly useful in hand wheels which are employed in numerous arts, such as to turn rods, stems, shafts or other objects, I have particularly designed my invention for use in connection with steering wheels of motor vehicles, motor vessels and the like.

In the case of steering wheels, the operator usually grasps the rim of the wheel with his hand and when the wheel is turned in rounding a corner or otherwise changing the direction of the vehicle's travel the wrist of the operator is twisted and where the turn is abrupt or extensive the hand is usually shifted along the rim of the wheel.

The twisting of the wrist is awkward and tiring as is also the shifting of the hands and the control over the vehicle is impaired.

To overcome these faults hand wheels have hitherto been designed wherein a portion of the wheel intended to be grasped by the hand is arranged to pivot as the wheel is turned, thus avoiding wrist twisting and hand shifting, but in such cases an especially designed and built wheel is required to be substituted for the type of wheel in general use.

The object which I have is the provision of an attachment which will accomplish the purposes referred to and which may be applied to a standard hand wheel, such as the steering wheel of a motor vehicle, without rebuilding or altering the structure of the wheel. Thus the owner of a motor vehicle may purchase my improved attachment and may apply it to the steering wheel of his vehicle.

Preferably the attachment is arranged to be readily mounted or dismounted from the steering wheel without requiring skill or special tools.

In general my improved attachment comprises a hand grip mounted to rotate on a supporting member which may be detachably secured to adjacent spokes or other portions of the wheel and which when in use will turn on an axis substantially parallel with the axis of the wheel.

Again, I provide means whereby when the attachment is not to be used it may be turned down out of the way and held retracted so as not to interfere with the convenient use of the wheel in the ordinary way.

Other novel features of construction, and also of arrangement of parts, will appear from the following description.

In the accompanying drawing, wherein I have illustrated a practical embodiment of the principles of my invention, Fig. 1 is a broken plan view of a steering wheel with my attachment applied thereto.

Fig. 2 is a front elevation of the attachment with the steering wheel shown in section along the line 2—2 in Fig. 1.

Fig. 3 is a broken top plan view showing the attachment turned down or retracted out of the way and locked in place.

Fig. 4 is a detail in section along the line 4—4 in Fig. 2.

Referring to the drawing, 1 represents the continuous annular rim of a steering wheel which is supported from the hub 2 by the spokes 3. 4 indicates the steering post on which the wheel is fixed.

5 represents a supporting bar or strut, preferably of arcuate form corresponding to the curve of the rim 1. The bar 5 is positioned inwardly from the rim and its ends are extended beneath the adjacent spokes 3, and also detachably secured to said spokes in any convenient manner as by the screws 6.

The intermediate portion of the bar is bowed downwardly or depressed to provide clearance for the parts to be described.

7 represents opposed bearings which are in the form of blocks fixed on the top of the bar 5 equally distant from the center of said bar. At least one of said bearings should be detachable to form the assemblage of parts, and it may be secured to the bar as by means of the screws 8.

9 represents a member provided with the opposed trunnions 10 which are journaled in the bearings 7, thus permitting the member 9 to turn on an axis coincident with the axis of the bearings.

The intermediate portion of the member 9 is enlarged to form a circular disk 11 which has a central cylindrical hole 12, and which is provided on its upper and lower faces with annular raceways 13 for balls or other antifriction members.

14 is a yoke member between the arms of which is mounted the hand grip 15. The central portion or bridge of the yoke 14 is provided with a circular enlargement 16 whose under surface is provided with an annular raceway 17 which is arranged to mate with the upper raceway 13 of the disk 11 when the parts are assembled. The enlargement 16 is also provided with a central hole 18 which when the parts are assembled register with the hole 12. The hole 18 is threaded.

19 represents a circular plate having an annular raceway 20 on its upper surface which mates with the lower raceway 13 when the parts are assembled, the plate 19 is also provided with the central threaded hole 21 which registers with the hole 12 when the parts are assembled.

22 represents a bushing which is exteriorly threaded and which when the parts are assembled, as illustrated in Fig. 4, is secured into the threaded holes 18 and 21, the hole 12 being unthreaded and of sufficient diameter to permit the bushing to rotate in the hole. The bushing thus holds the parts assembled together and pivotally mounts the other parts on the bridge of the yoke 14.

The support 5 is provided with a hole 23 which is engaged by a locking bolt 24 slidably mounted on the bushing 22. The bolt 24 is provided with a reduced stem which extends upwardly through the reduced upper bore of the bushing. The upper extremity of the bolt is provided with a head 25. A helical spring 26 is arranged to force the bolt downwardly.

When the yoke and grip are in their vertical and operative position indicated in Figs. 1, 2 and 4 the bolt 24 is stepped in the hole 23, thus locking the attachment against accidental movement out of its operative position.

When the attachment is not to be used by the operator the head of the bolt is seized by the fingers and the bolt is drawn up out of the hole 23 and thus the attachment may be swung down in horizontal or retracted position as illustrated in Fig. 3.

To maintain the attachment in its horizontal position and to prevent such accidental displacement therefrom I provide means for securing it in such retracted position.

Thus I have shown one of the bearing blocks 7 provided with a socket 27 in which is held the ball latch 28 pressed outwardly by the helical spring 29, the metal at the outer end of the socket being upset inwardly to prevent the dislodgement of the ball. The yoke 14 is provided with concaved seat 30 which, when the yoke is turned down into its retracted position illustrated in Fig. 3, is engaged by the ball 28, thus holding the yoke against accidental movement.

When the yoke is swung downwardly the ball automatically engages the seat and when the yoke is to be turned upwardly an upward pull on the grip will release the ball from the seat.

When the attachment is to be used by the operator he grasps the grip 15 with his hand, and as the wheel turns the grip and yoke will rotate, thus maintaining the hand in a natural position and avoiding the necessity of shifting the hands relative to the wheel as is now the general practice. Thus a natural wrist movement is provided for which will not tire the driver and which will facilitate turning the wheel. Thus curves and turns may be made safely at much higher speeds than are now reasonably possible and the response of the vehicle in change of direction is much easier and more prompt.

Usually but one of my improved attachments, for use with the left hand of the operator, is all that is necessary, but if desired two attachments may be mounted on the steering wheel, one for each hand.

Although my invention comprises very marked advantages for use in connection with steering wheels for vehicles, it is obvious that it may be applied to many other types of hand wheels with similar advantage. Thus it is highly useful in connection with the hand wheels of valves and gates and also the hand wheels of the brakes of railway cars and the like.

The attachment may be made at slight cost and may be sold at a reasonable price within the reach of any automobile owner, and may be purchased and attached to the wheel or removed therefrom without requiring any particular skill or special tools.

What I claim is:—

1. An attachment for hand wheels comprising in combination a support arranged to bridge the space between adjacent spokes of the wheel and to be secured thereto, opposed bearings carried by said support, a member having its ends journaled in said bearings, and a hand grip pivotally mounted on said member to turn on an axis which is angular to the axis of the movement of said member in said bearings.

2. An attachment for hand wheels comprising in combination a support arranged to bridge the space between adjacent spokes of the wheel and to be secured thereto, opposed bearings carried by said support, a member having its ends journaled in said bearings, a hand grip pivotally mounted on said member to turn on an axis which is angular to the axis of the movement of said member in said bearings, and means for holding said member against movement relative to said support whereby said hand grip may be retained in its inoperative position.

Signed at Pittsburgh, Pa., this 22nd day of January, 1931.

JOSEPH E. WHITFIELD.